US006656572B2

(12) United States Patent
Steinbeck et al.

(10) Patent No.: US 6,656,572 B2
(45) Date of Patent: Dec. 2, 2003

(54) SUPPORT MATERIAL

(75) Inventors: Rainer Steinbeck, Osnabrück (DE); Detlef Wacker, Ornabrück (DE)

(73) Assignee: Felix Schoeller jr. Foto-und Spezialpapiere & Co. KG (DE)

(*) Notice: Subject to any disclaimer, the term of this patent is extended or adjusted under 35 U.S.C. 154(b) by 28 days.

(21) Appl. No.: 09/794,805

(22) Filed: Feb. 27, 2001

(65) Prior Publication Data

US 2001/0021442 A1 Sep. 13, 2001

(30) Foreign Application Priority Data

Feb. 28, 2000 (DE) ........................................ 100 09 247

(51) Int. Cl.[7] ................................................ B32B 3/00

(52) U.S. Cl. ......................... 428/195; 428/98; 430/348; 430/357

(58) Field of Search .................. 428/195, 98; 430/348, 430/357

(56) References Cited

U.S. PATENT DOCUMENTS

| | | | | | |
|---|---|---|---|---|---|
| 5,888,714 A | | 3/1999 | Bourdelais et al. | | |
| 6,017,686 A | | 1/2000 | Aylward et al. | | |
| 6,083,611 A | * | 7/2000 | Eichbauer et al. | .......... | 428/213 |
| 6,087,079 A | * | 7/2000 | Newberry et al. | .......... | 430/510 |
| 6,094,889 A | * | 8/2000 | Van Loon et al. | ............ | 53/450 |
| 6,114,102 A | * | 9/2000 | Aylward et al. | ............ | 430/536 |
| 6,287,700 B1 | * | 9/2001 | Kong et al. | ................. | 428/447 |
| 6,335,102 B1 | * | 1/2002 | Tsubaki et al. | ............. | 428/513 |
| 6,468,709 B2 | * | 10/2002 | Aylward et al. | ............ | 430/207 |

FOREIGN PATENT DOCUMENTS

| | | |
|---|---|---|
| DE | 198 80 298 | 8/1998 |
| EP | 0 880 065 | 11/1998 |
| EP | 0 880 066 | 11/1998 |
| JP | 7-092607 | 4/1995 |
| JP | 7-270969 | 10/1995 |
| WO | WO 00/59721 | 10/2000 |

* cited by examiner

*Primary Examiner*—Bruce H. Hess
*Assistant Examiner*—Tamra Dicus
(74) *Attorney, Agent, or Firm*—Cook, Alex, McFarron, Manzo, Cummings & Mehler Ltd.

(57) ABSTRACT

A support material for photographic and non-photographic imaging processes which includes a raw paper and a thermoplastic layer arranged on the front side, the thermoplastic layer features at least one polyolefin layer arranged on the raw paper, at least one polyethylene layer arranged over the polyolefin layer and at least one of these layers contains a polyethylene obtained by means of metallocene catalysts.

7 Claims, No Drawings

SUPPORT MATERIAL

BACKGROUND OF THE INVENTION

The invention relates to a support material for photographic and non-photographic imaging processes with a raw paper and at least one thermoplastic layer arranged on the front of the raw paper.

The principle is known of refining papers for photographic and non-photographic imaging processes by surface combination with at least one polyolefin layer by extrusion, co-extrusion, or lamination. The purpose of this is to improve the appearance and properties of the base material. Coating with polyethylene plays a major part in this.

For coating the front side of papers for imaging processes, low-density polyethylene (LDPE) is usually used. The advantages of this polymer lie mainly in the price and in the largely trouble-free processing. Thus, in particular, the extrusion of a film with uniform thickness is manifested without any problem. Photographic papers coated with polyethylene can undergo further processing without any problem; i.e. they can be coated with light sensitive emulsion layers. Very good adhesion between the gelatines of the photoemulsion and the coated paper can be achieved by corona treatment of the PE paper. Polyethylene coatings also feature a range of disadvantages in comparison with coatings with other polymers, however. Under thermal treatment, the LDPE molecules are inclined to cross-linking reactions, which substantially increases the melt viscosity. This mechanism leads to unevenness of the paper base layer which is to be coated, which result from the fibre structure, and which can only be compensated for to an unsatisfactory degree during the extrusion coating. This results in a reduction of gloss and smoothness of the coated paper. In addition, an increase may be observed in the thickness fluctuations in the middle image tones and what is referred to as mottle on the papers coated with photographic emulsions and developed.

Polypropylene does not feature these problems in thermoplastic processing. During processing, a drastic reduction in melt viscosity is observed, which can be explained by partial breaking of the polymer chains without subsequent cross-linking reactions. Polypropylene is accordingly clearly better suited than LDPE to equalize unevenness in the paper base layer which is to be coated, and so leads to an optically smoother surface of the extruded paper.

However, a series of problems arise at the coating of the polypropylene and during further processing. With polypropylene, a uniform coating thickness of the extruded film can only be applied with great difficulty during the extrusion coating, because the inadequate film stability of the film extruded from the nozzle leads, for example, to constrictions and therefore to considerable application fluctuations in the range of several g/m$^2$. Papers which were coated with a polypropylene homopolymer or also with a polypropylene/polyethylene copolymer show, at the application of a photographic emulsion, a drastic deterioration in the adherence of the photographic emulsion to the carrier. This problem cannot be compensated for even by a stronger corona treatment. In addition to this, with the use of polypropylene/polyethylene copolymers, the polypropylene-specific properties are in part lost.

EP 0 880 065 A describes a photo carrier material which is characterised by an especially smooth surface and high rigidity. This carrier material consists of a paper support and a multi-layered film on the front side. The film is composed of at least three layers, and is biaxially oriented. For preference polypropylene films are extruded. Paper support and film are joined by means of an extruded polyethylene layer. Disadvantageous in this context are the high production costs and the inadequate adherence of the photographic emulsion. To improve the adherence, an additional adherence layer must be applied.

EP 0 880 066 A likewise describes a photo carrier material on a paper support and a multilayer polypropylene film. This film is extrusion-coated with a polyethylene. As a result, a readily-attainable adherence of the photographic layer is achieved, with a good surface, but this again increases the costs in relation to a standard photo support material. Disadvantages are again the adherence problems which arise between the polypropylene film and the extruded polyethylene layer.

JP 7 092 607 A describes a photographic carrier material coated with polyethylene with high gloss and good adherence. The single polyethylene layer contains, as its main constituent, a polyethylene manufactured by means of metallocene catalysts. The Mw/Mn ratio with this polyethylene is greater than 5. Disadvantageous with this paper is the inclination to mottle. No increase in rigidity can be achieved by means of this support material.

JP 7 270 969 A describes a photo carrier material which can be coated on the front side of a polyethylene layer and a polypropylene layer. In this situation the polypropylene layer can be applied as the upper layer. This results in a support material with a high gloss. The emulsion adherence with this formulation, however, is inadequate; adherence between the polymer layers is not satisfactory either.

In addition to the surface properties, the strength values of the support material play an important part. With the use of films on materials similar to films, good surface qualities and high rigidity values can be achieved. Properties such as resistance to tearing are in general impaired. With thermoplastic coated papers, with only one resin layer, strength properties such as resistance to tearing are, as a rule, good.

SUMMARY OF THE INVENTION

The object of the invention is to provide a support material for photographic and non-photographic imaging processes with a smooth surface, similar to a film, which on the one hand allows for good adherence of the photographic emulsion or the recipient layer, and, on the other, good adherence between the different thermoplastic polymer coatings, with good mottle behaviour, high rigidity and tearing resistance with, at the same time, low production costs.

The problem is solved by a support material comprising a raw paper provided with a thermoplastic layer on the front side, whereby the thermoplastic layer contains at least one polyolefin layer arranged on the raw paper and at least one polyethylene layer, and at least one of these layers contains a polyethylene obtained by means of metallocene catalysts. For preference, the polyethylene layer contains the metallocene polyethylene.

Metallocene polyethylenes are copolymers of the ethene with α-olefins such as butene-1, hexene-1, or octene-1, manufactured with the aid of metallocene catalysts. These polyethylenes and there manufacture are known.

DETAILED DESCRIPTION OF THE PREFERRED EMBODIMENTS

A polyethylene layer is applied onto the surface of a raw paper by means of (co) extrusion of at least one polyolefin layer and at least one polyethylene layer. The polyolefin layer is in this case located on the raw paper. The polyethylene layer is arranged above the polyolefin layer. For the polyolefin layer, a variety of different polyethylene types can be used, such as HDPE, MDPE, or LDPE. These polyolefins can be manufactured by means of Ziegler or also metallocene catalysts. The use of polypropylenes, polybutylenes, and other polyolefins is also possible.

For preference, the lower layer is a polypropylene layer. By means of this layer arrangement, the positive properties of the lower layer, such as uniform coating of the raw paper and high gloss, can be combined with the good adherence properties of the polyethylene.

The application weight of the polyolefin layer can be 10 to 35 g/m$^2$, for preference 15 to 25 g/m$^2$. The application weight of the polyethylene layer is 2 to 30 g/m$^2$, for preference 10 to 20 g/m$^2$. All known polypropylene types are suitable for the polypropylene coating. Propylene homopolymers and/or propylene copolymers can be used. Mixtures of polypropylene with other polyolefins can be used. Especially preferred are polypropylene types with long-chain branches (HMS types). To improve opacity, pigments can be added such as titanium dioxide, clay (kaolin), calcium carbonate, or zinc oxide. Titanium dioxide may be present in the layer in a volume from 0 to 15% by weight, for preference 5 to 12% by weight. Titanium dioxide can also be used in the anatase or rutile form.

For the polyethylene coating, use is made for preference of a mixture of standard LDPE (density 0.9–0.936 g/cm$^3$) and an LDPE, manufactured by means of metallocene catalysts. Particularly suitable are metallocene polyethylenes with an Mw/Mn ratio of $\leqq$3.5. Particularly preferred is an Mw/Mn ratio of 1.8 to 2.8. The proportion of metallocene polyethylene is 10 to 60% by weight, for preference 20 to 40% by weight. Particularly well-suited is a metallocene LDPE with a density from 0.70 to 0.90 g/cm$^3$. To increase the opacity and whiteness, it is likewise possible for the pigments used in the polypropylene layer to be added. For preference, use is made in this layer too of titanium dioxide in a volume of 7 to 20%, and in particular in a volume of 10 to 16% by weight, in one of the two crystal forms referred to heretofore.

The reverse side of the raw paper can be coated in the same manner as the front side. For preference, use is made of an extrusion coating with a polyethylene homopolymer and/or copolymer. The application weight of the back side layer is 5 to 60 g/m$^2$, for preference 10 to 40 g/m$^2$.

All types of cellulose fibres and synthetic fibres are suitable for manufacturing the base paper. Coniferous and/or deciduous pulps can be used, macerated by alkaline or acidic processes. For sizing, all known sizing agents and wet strength agents known in the paper industry are suitable. All inorganic compounds such as clay (kaolin), calcium carbonate, and titanium dioxide are suitable as pigments. The base paper may contain additional additives and auxiliary agents such as defoaming agents, optical brighteners, and colouring agents. It can be manufactured on Fourdrinier or Yankee paper machines. The basis weight of the base paper may amount to 40 to 300 g/m$^2$. To improve the surface properties, the base paper can be treated with a smoothing device or a calander.

The coating of the raw paper according to the invention with the thermoplastic polymers can be effected by extrusion or coextrusion. In this situation, the polymer layers can be applied one after another or simultaneously. The extrusion speed may be between 100 and 500 m/min.

The base paper can be provided with further function layers such as an anti-static layer or printable layers on the front and/or reverse.

The following examples are intended to provide further explanation of the invention.

EXAMPLES

Manufacture of the Raw Paper

To manufacture the raw paper, a mixture of 50% by weight deciduous sulphate pulp and 50% by weight deciduous sulphite pulp is beaten at a substance density of 4% to a degree of beating of 35° SR. Added to the pulp suspension as sizing substances were corn starch, polyamide/polyamine epichlorohydrin resin, alkyl ketenedimer, epoxide, and fatty acid amide, and from this a raw paper weighing 190 g/m$^2$ is manufactured. The paper was surface-sized with a polyvinyl alcohol solution and smoothed.

Example 1

The raw paper was provided on the front with a polypropylene as the lower layer by means of coextrusion, and a polyethylene as the upper layer. The layers had the following composition:

Polypropylene Layer:

80% by weight polypropylene PF-611® from Montell, 20% by weight LLDPE master batch with 50% by weight titanium dioxide in rutile form, application weight 20 g/m$^2$.

Polyethylene Layer:

20% by weight metallocene polyethylene, Affinity® EG 8200, 59% by weight LDPE, Stamylan® LD 2304, 21% by weight LDPE master batch with 50% by weight titanium dioxide in anatase form, application weight 15 g/m$^2$.

Example 2

The raw paper was provided by coextrusion on the front with a polypropylene as the lower layer and a polyethylene as the upper layer. The layers had the following composition:

Polypropylene Layer:

80% by weight polypropylene PF-611® from Montell, 20% by weight LLDPE master batch with 50% by weight titanium dioxide in rutile form, application weight 20 g/m$^2$.

Polyethylene Layer:

30% by weight metallocene polyethylene, Affinity® EG 8200, 50% by weight LDPE, Stamylan® LD 2304, 20% by weight LDPE master batch with 50% by weight titanium dioxide in rutile form, application weight 15 g/m$^2$.

Example 3

The raw paper was provided by coextrusion on the front with a polypropylene as the lower layer and a polyethylene as the upper layer. The layers had the following composition:

Polypropylene Layer:

80% by weight polypropylene PF-611® from Montell, 20% by weight LLDPE master batch with 50% by weight titanium dioxide in rutile form, application weight 20 g/m$^2$.

Polyethylene Layer:

60% by weight metallocene polyethylene, Affinity® EG 8200, 20% by weight LDPE, Stamylan® LD 2304, 20% by weight LDPE master batch with 50% by weight titanium dioxide in rutile form, application weight 15 g/m$^2$.

Example 4

The raw paper was provided by coextrusion on the front with a polyethylene as the lower layer and a polyethylene as the upper layer. The layers had the following composition:

Lower polyethylene Layer:

80% by weight LDPE, Stamylan LD 2304, 20% by weight LDPE master batch with 50% by weight titanium dioxide in rutile form, application weight 20 g/m$^2$.

Polyethylene Layer:

20% by weight metallocene polyethylene, Affinity® EG 8200, 60% by weight LDPE, Stamylan® LD 2304, 20% by weight LDPE master batch with 50% by weight titanium dioxide in rutile form, application weight 15 g/m$^2$.

Example 5

The raw paper was provided by coextrusion on the front with a polypropylene/polyethylene as the lower layer and a polyethylene as the upper layer. The layers had the following composition:

Polypropylene/polyethylene Layer:

60% by weight polypropylene PF-611® from Montell, 20% by weight metallocene polyethylene, Affinity® EG 8200, 20% by weight LLDPE master batch with 50% by weight titanium dioxide in rutile form, application weight 20 g/m$^2$.

Polyethylene Layer:

80% by weight LDPE, Stamylan® LD 2304, 20% by weight LOPE master batch with 50% by weight titanium dioxide in rutile form, application weight 15 g/m$^2$.

Affinity® EG 8200 is a metallocene polyethylene with a density of 0.870 g/cm$^3$ and a melt index of 5.0 g/10 min, Mw/Mn ratio 2.8.

Stamylan® LD 2304 is an LDPE with a density of 0.923 g/cm$^3$ and a melt index of 4.4 dg/min.

PF-6111® is polypropylene homopolymer with a density of 0.90 g/cm$^3$ and melt index of 30 dg/min.

The reverse of the papers coated according to the examples was coated with a mixture of 50% by weight of an LDPE and 50% of a high-density polyethylene (HDPE) by extrusion. The application weight was 25 g/m$^2$.

With all the polypropylene coatings, the melt pressure was 151 bar and the melt temperature 305° C.

With the polyethylene coatings, the melt pressure was 145 bar and the melt temperature 306° C.

Comparison Example 1

A coating of 80% by weight LDPE, Stamylan® LD 2304 from DSM, and 20% by weight LDPE master batch with 50% by weight titanium dioxide in rutile form was applied by melt extrusion to the raw paper. The application weight was 35 g/m$^2$. To achieve a good emulsion adherence, the surface of the coated support material was irradiated with a corona power rating of 30 KW.

Comparison Example 2

Two polyethylene layers were applied to the raw paper by means of coextrusion. The total application weight was 35 g/m$^2$. Both layers had the following composition:

80% by weight LDPE, Stamylan® 2304 from DSM, 20% by weight LDPE master batch with 50% by weight titanium dioxide in rutile form.

Comparison Example 3

The polypropylene from Example 1 was applied by coextrusion to the raw paper as a bottom layer. As an upper layer, by analogy with JP-7 092 607, a mixture of LDPE and a metallocene polyethylene with an Mw/Mn ratio of 5.7 was applied. The application weight of the polypropylene layer was 20 g/m$^2$, and that of the polyethylene layer 15 g/m$^2$.

Comparison Example 4

The polypropylene from Example 4 was applied to a raw paper with an application weight of 35 g/m$^2$ by means of extrusion.

The reverse of the paper coated in accordance with the comparison examples was coated by extrusion with a mixture of 50% by weight of an LDPE and 50% by weight of a high density polyethylene (HDPE). The application weight was 25 g/m$^2$.

The following tests were carried out on Examples 1 to 5 and the comparison examples:

Gloss measurement: Samples of Examples 1 to 5 and of the comparison examples were coated with a light-sensitive silver bromide emulsion. The samples were subjected to light and developed on a blackboard. The gloss test was carried out on these blackboards with a triangular gloss measuring device according to DIN 67530 at an angle of 20°.

Mottle: Samples of Examples 1 to 5 and of the comparison examples were coated with a light-sensitive silver bromide emulsion. The samples were subjected to light on a medium grey tone and developed. The mottle was evaluated visually on the basis of comparison examples with scales of 1 to 6 (very good to deficient).

Adherence: Samples of Examples 1 to 5 and of the comparison examples were coated with a light-sensitive silver bromide emulsion. The samples were subjected to light on a medium grey tone and developed. The wet emulsion was scratched slightly. A cloth was then rubbed 20 times over the damaged point. The release of the emulsion was evaluated visually with the grades 1 to 6 (no release to substantial surface release).

The results of the tests are shown in Table 1.

TABLE 1

| Sample | Gloss | Mottle | Adherence |
|---|---|---|---|
| Example 1 | 77.9 | 1 | 1 |
| Example 2 | 78.3 | 1 | 1 |
| Example 3 | 78.2 | 1 | 1 |
| Example 4 | 78.1 | 1 | 1 |
| Example 5 | 77.7 | 1 | 1 |
| Comparison example 1 | 73.9 | 2–3 | 2 |
| Comparison example 2 | 74.1 | 2–3 | 2 |
| Comparison example 3 | 74.2 | 2–3 | 2 |
| Comparison example 4 | 78.5 | 1–2 | 5 |

The results of the measurements show that, by means of the layer formation described, a support material can be manufactured with high gloss, good mottle properties, and good adherence of the photographic layer to the upper resin layer of the support material according to the invention. The degree of stiffness and resistance to further tearing were also improved.

It was not possible to achieve adequate adherence between the polypropylene and polyethylene layers on comparison example 3.

What is claimed is:

1. A support material for photographic and non-photographic imaging processes with a raw paper and a thermoplastic layer arranged on a side of the paper, wherein the thermoplastic layer contains at least one polyolefin layer arranged on the raw paper and at least one layer of polyethylene which is receptive to an imaging layer and, which is obtained by means of a metallocene catalyst arranged over the polyolefin layer, and wherein the metallocene polyethylene has a ratio of Mw/Mn of ≦3.5.

2. A support material according to claim 1, wherein the metallocene polyethylene has a density from 0.70 to 0.90 $g/m^3$.

3. A support material according to claim 1, wherein the proportion of the metallocene polyethylene amounts to 10 to 60% by weight related to the weight of the layer.

4. A support material according to claim 1, wherein the polyolefin layer contains a polypropylene homopolymer and/or copolymer.

5. A support material according to claim 1, wherein said polyethylene layer has a further layer thereon which is capable of photographic development.

6. A support material according to claim 1, wherein said polyethylene layer has a further layer thereon which is capable of ink-jet printing.

7. A support material according to claim 1, wherein said polyethylene layer has a further layer thereon which is capable of thermal colouring agent diffusion printing.

* * * * *